(12) United States Patent
Madathiparambil

(10) Patent No.: US 9,147,091 B2
(45) Date of Patent: Sep. 29, 2015

(54) PRINTING BARCODES FROM AN ENTERPRISE RESOURCE PLANNING (ERP) SYSTEM

(71) Applicant: Hewlett-Packard Development Company, L.P., Houston, TX (US)

(72) Inventor: Prasad Antony Madathiparambil, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/871,749

(22) Filed: Apr. 26, 2013

(65) Prior Publication Data

US 2014/0246486 A1    Sep. 4, 2014

(30) Foreign Application Priority Data

Mar. 1, 2013    (IN) .............................. 909/CHE/2013

(51) Int. Cl.
*G06K 19/00* (2006.01)
*G06K 1/12* (2006.01)
*G06F 3/12* (2006.01)

(52) U.S. Cl.
CPC .............. *G06K 1/121* (2013.01); *G06F 3/1206* (2013.01); *G06F 3/1247* (2013.01); *G06F 3/1288* (2013.01)

(58) Field of Classification Search
USPC ................................... 235/435, 439, 454, 462
See application file for complete search history.

(56) References Cited

U.S. PATENT DOCUMENTS

| 6,972,863 | B2 | 12/2005 | Parry | |
|---|---|---|---|---|
| 7,689,514 | B2 | 3/2010 | Ford et al. | |
| 2006/0242549 | A1 | 10/2006 | Schwier et al. | |
| 2008/0158605 | A1 | 7/2008 | Engbrocks et al. | |
| 2010/0147960 | A1* | 6/2010 | Bailey ........................... | 235/494 |
| 2010/0195142 | A1* | 8/2010 | Watanabe .................... | 358/1.15 |

OTHER PUBLICATIONS

"IDAutomation Barcode Label Software Pro"; Mar. 21, 2006 < http://windows9download.net/inventory-systems/idautomation-barcode-label-software-pro-21118.html >.
Fuji Xerox, "ApeosWare Device Type for SAP R/3", date retrieved Apr. 15, 2015. http://www.fxap.com.sg/product/multifunction/apeosware/index.jsp.
Xerox, "SAP Device Types for Xerox Printers Support & Software", retrieved date Apr. 15, 2015. http://www.support.xerox.com/support/sap-device-types-for-xerox-printers/support-options/enus.html.

* cited by examiner

*Primary Examiner* — Matthew Mikels
(74) *Attorney, Agent, or Firm* — Mannava & Kang

(57) ABSTRACT

Provided is a method of printing barcodes from an Enterprise Resource Planning (ERP) system. A label name is added to a barcode data in the ERP system, wherein the label name is unique to a barcode in the barcode data. The label name and the barcode data are transmitted to a server. The label name is analyzed to identify the barcode in the barcode data, and the identified barcode is replaced with a PostScript program, unique to the identified barcode, for visually rendering the identified barcode. The PostScript program, unique to the identified barcode, is transmitted for printing the identified barcode.

14 Claims, 4 Drawing Sheets

PRINTING BARCODES FROM AN ENTERPRISE RESOURCE PLANNING (ERP) SYSTEM

CLAIM FOR PRIORITY

The present application claims priority under 35 U.S.C. 119 (a)-(d) to Indian Patent application number 909/CHE/2013, filed on Mar. 1, 2013, which is incorporated by reference herein in its entirety.

BACKGROUND

Usage of Enterprise Resource Planning (ERP) systems has gained popularity among enterprises over the last few years. An increasing number of businesses around the world have either implemented or are in the process of implementing an ERP program or module to manage one or more aspects of their functions such as inventory control, human resource, marketing, finance, distribution, etc. Such widespread acceptance has led to a tremendous increase in printing of documents from ERP systems.

BRIEF DESCRIPTION OF THE DRAWINGS

For a better understanding of the solution, embodiments will now be described, purely by way of example, with reference to the accompanying drawings, in which:

FIGS. 3A to E illustrates a method of adding a label name to barcode data in a SAP ERP system, according to an example.

DETAILED DESCRIPTION OF THE INVENTION

As mentioned earlier, large scale deployment of ERP systems or modules in organizations has led to an increase in printing of documents generated by such systems. For example, individuals may print various kinds of reports created in ERP systems. Within this context, there's also an increase in demand for printing various types of barcodes from an ERP system.

In traditional bar code printing, the bar codes get printed only if a device type maps the barcodes to printer commands. Further, traditional bar code printing may require special firmware. Presently, support for barcode printing from an ERP system is not available using a PostScript (PS) device type for a large number of laser or inkjet printers. This is an unfortunate situation since PS device types have certain advantages over other device types, for instance PCL device types, which include stability in page alignment, margin alignment, generalized printed paper layout on a wide range of printer models, easiness to use cascading fonts, possibility to use customized attributes like X shift, Y shift, up and down etc. in the plugged-in applications. Due to these and other advantages, a lot of customers prefer to use PS device type rather than other device types, for instance PCL device type. Since PS device type cannot support traditional barcodes, it's a constraint for customers to use barcodes using PS device type for their business printing.

There is no standalone server based solution available, which can support ERP barcode printing having support of all the available barcodes in the market including QR codes.

Proposed is a solution that provides printing of barcodes from an ERP system for PostScript (PS) device type.

Figure 1:
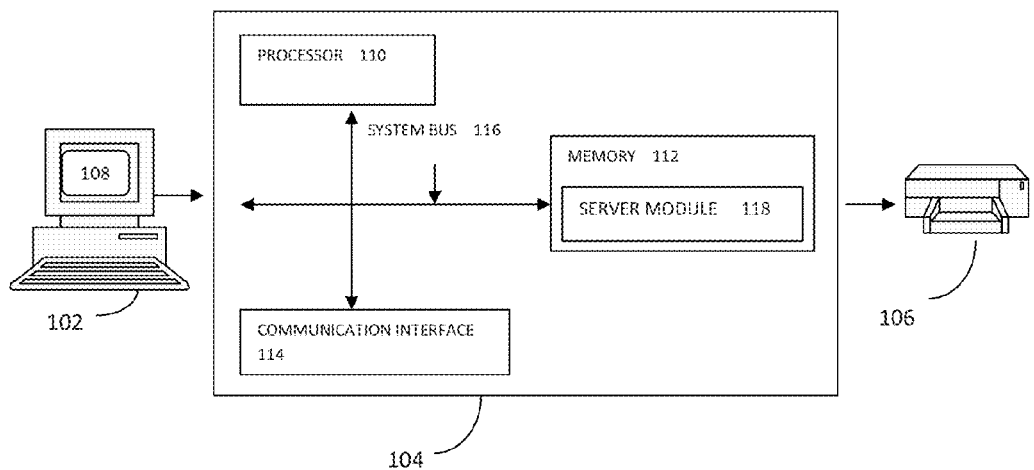
FIG. 1 is a schematic block diagram of system, according to an example.

FIG. 1 is a schematic block diagram of system 100, according to an example. System 100 includes ERP system 102, computer server 104, and printer 106. Various components of system 100 i.e. ERP system 102, computer server 104, and printer 106 could be operationally connected over a network, which may be wired or wireless (for example, a telecom network). The network may be a public network such as the Internet, or a private network such as an intranet.

ERP system 102 may be hosted on a computing device such as, but not limited to, a desktop computer, a computer server, a notebook computer, a tablet computer, and the like. ERP system 102 may include various components such as an ERP client device, an ERP server and an ERP database. In an implementation, these components may be distributed over a client-server environment. In another implementation, however, they could be present within the same computing device.

ERP system 102 may include a Postscript device type 108. A device type is a configuration file for a printer driver that ensures proper functionality between a data stream and a printer. In an implementation, the Postscript device type is a Universal Unicode Postscript SAP device type developed by Hewlett-Packard Company. Postscript device type 108 in ERP system 102 adds a label name to barcode data in the ERP system wherein the label name is unique to a barcode in the barcode data. For instance, when a print request is generated (or received from a user) in ERP system 102 and it is determined that barcode data is present in the document data stream meant for printing, Postscript device type 108 adds a unique label name corresponding to the barcode in the barcode data. Upon such addition, the Postscript device type forwards the document data for transmission to computer server 104. A label name is a logical name for a barcode.

In an implementation, ERP system 102 includes an ERP system from SAP AG. However, in other implementations, ERP systems by other vendors may be used.

Computer server 104 is a computer or computer application (machine executable instructions) that provides services to other computers or computer applications. Computer server 104 may include a processor 110, a memory 112, and a communication interface 114. The components of computer server may be coupled together through a system bus 116. Processor 110 may include any type of processor, microprocessor, or processing logic that interprets and executes instructions. Memory 112 may include a random access memory (RAM) or another type of dynamic storage device that may store information and instructions non-transitorily for execution by processor.

In an implementation, memory 112 includes server module 118. Server module 118, upon receipt of a data stream containing barcode data and a unique label name corresponding to a barcode in the barcode data, analyses the unique label name to identify the barcode in the barcode data. Server module 118 allocates or defines the label name unique to a barcode, and maintains a repository that stores the mapping between unique label names and their corresponding bar codes. Thus, in an implementation, when a data stream containing barcode data and a unique label name is received, for instance, from an ERP system such as ERP system 102, server module scrutinizes the unique label name in the data stream and identifies the barcode corresponding to the unique label name by referring to said repository. Apart from storing the mapping between unique label names and their corresponding bar codes, the repository may also store a Postscript program (machine readable instructions) corresponding to each barcode in the repository. In an instance, upon identification of a barcode corresponding to a unique label name in a data stream, server module 118 replaces the identified barcode with a corresponding Postscript program in the data stream. The data stream is then transmitted to printer 106 for printing the identified barcode. Thus, replacement of barcode with corresponding Postscript program results in visually rendering of the barcode, for instance on a print media.

Communication interface may include any transceiver-like mechanism that enables computer server 104 to communicate with other devices and/or systems via a communication link. Communication interface may be a software program, a hardware, a firmware, or any combination thereof. Communication interface may use a variety of communication technologies to enable communication between computer server and another computing device. To provide a few non-limiting examples, communication interface may be an Ethernet card, a modem, an integrated services digital network ("ISDN") card, etc.

Printer 106 is a peripheral device which produces a representation of an electronic document on physical media such as paper. Some non-limiting examples of printer 106 may include a dot-matrix printer, an inkjet printer, a laser printer, a PostScript (PS) printer, etc.

Printer 106 may include a multifunction printer (MFP), also known as multi-function device (MFD), or all-in-one (AIO) printer. A MFP can print, scan, and copy among their many features. Printer 106 may include a memory, a communication unit for communicating with another computing device such as computer server 104, and a processor for controlling the memory and the communication unit. In an implementation, the processor, upon receipt of a data stream from computer server 104, wherein the data stream includes a PostScript program unique to a barcode generated by ERP system 102, prints the barcode on a print medium. The PostScript program may be selected by computer server 104 upon identification of the barcode from a label received in a data stream from ERP system 102. Printer 106 may be a network printer which may be connected to computer server 104 over a Local Area Network (LAN), Wireless Area Network (WAN), or the Internet.

Figure 2:
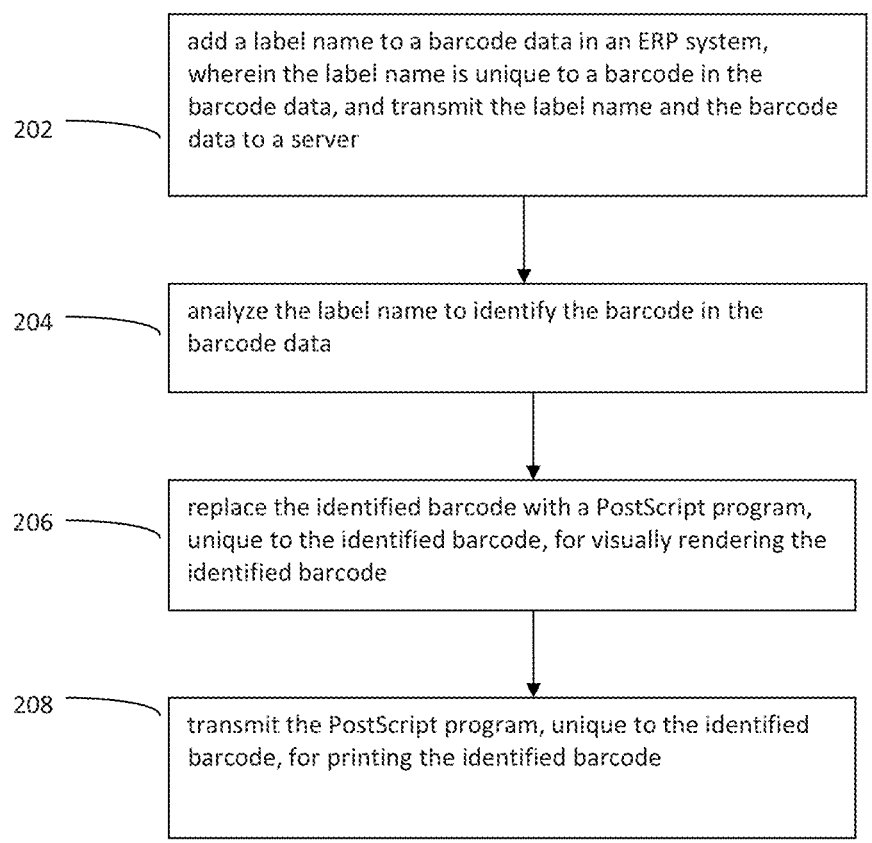
FIG. 2 illustrates a method of printing barcodes from an ERP system, according to an example.

FIG. 2 illustrates a method of printing barcodes from an Enterprise Resource Planning (ERP) system, according to an example.

At block 202, a label name is added to barcode data in an ERP system. The barcode data may be generated in the ERP system and may include one barcode or a plurality of barcodes. In an instance, barcode data may get generated when a user decides to print a barcode (or a document containing a barcode) from the ERP system and provides a print command to the ERP system. In another instance, barcode data may be automatically generated by the ERP system as part of a process or procedure implemented by the ERP system. In any event, upon generation of barcode data, a label name is added thereto wherein the label name is unique to a barcode in the barcode data. If more than one barcode is present in the barcode data, unique label names are added for each barcode to the barcode data.

The unique label name is meant to identify a barcode in barcode data and may be added to thereto by a device type. The device type may be present on the computing device hosting the ERP system or another computing device coupled to the ERP system. In an implementation, the device type is Universal Unicode Postscript SAP device type developed by Hewlett-Packard Company. In an instance, when a document print request is generated (or received from a user) in an ERP system and it is determined that barcode data is present in the document data stream meant for printing, device type adds a unique label name(s) for each barcode present in the barcode data. The addition of a label name to the document data stream may be carried out at a location where a visual representation of the barcode data is to be made in the printed document.

Once a unique label name has been added to barcode data for each barcode therein, the barcode data (or a data stream containing barcode data) along with label name is transmitted to a computer server, such as computer server 104 of FIG. 1.

FIGS. 3A to E illustrates a method of adding a label name to barcode data in a SAP ERP system, according to an example.

Figure 3A:
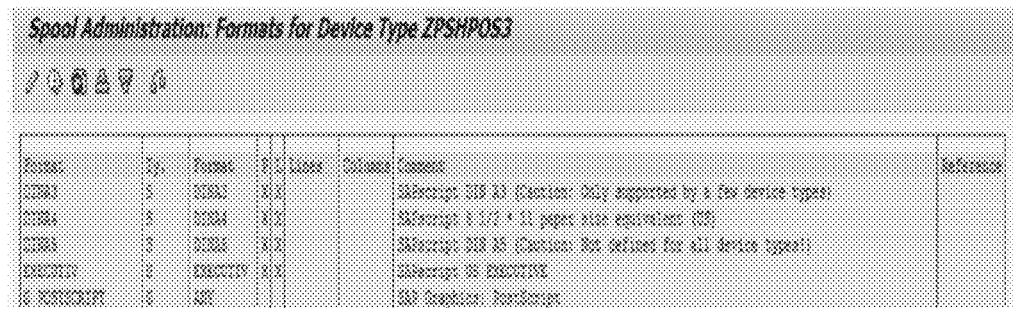
Figure 3B:
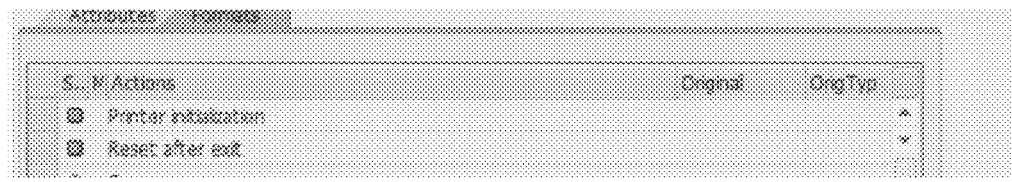

FIGS. 3A and B illustrate a location for defining a label name for a barcode in a SAP ERP system. To begin with "formats" in a device type are accessed in a SAP ERP system. To access the "formats" the following transaction flow may need to be executed from SAP. "SPAD→Full Administration→Device Types. Specify the name of device type and click "Display". Next, select "Formats". There may be a number of available formats such as "DINA4" for A4 and "DINA3" for A3 etc. This is illustrated in FIG. 3A. Upon selection of a format, a window of "Actions" will appear. This is illustrated in FIG. 3B. Different actions can be viewed like "Printer initialization", "Reset after exit" etc. These are the locations at which "label names" for barcodes may be specified. In other words, the label names defined by a server module are specified at the ERP system. In each action initialization, there can be references to other device type's formats or to format's actions using "\i". Hence the reference label codes are added to the initialization field of a format and also to different actions under same format. They could be referred from the other formats using \i".

In an instance, "Actions" for each barcode are separated so that customizations could be made and tracked in the future. In such case, actions for each barcode are defined and the corresponding label name is located accordingly. For e.g. different actions can be defined as ZHPC128 for Code 128 barcodes, ZHPC39 for Code 39 barcodes, ZHPCQR for QR barcodes etc.

Figure 3C:
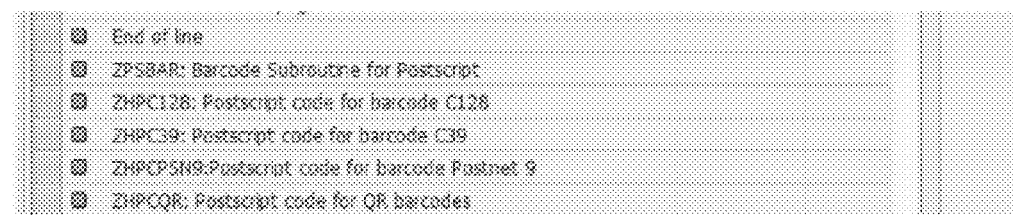

Referring to FIG. 3C, printer initialization action helps in making a reference to other device type's formats or format's actions using "\i". A postscript code, which may be required to perform certain actions by the device type when the data is delivered to a printer, can also be specified in the initialization section. For example, by adding the entries mentioned below in the "Printer initialization" field of all formats, a reference to the "label names", which need to be embedded in a document meant for printing, can be obtained. In this example, the actions are created under the DINA3 format and it can be accessed from all the actions under DINA3 and also from all the other formats like DINA4, DINA5 etc. using the below specification in the printer initialization field.

[Entries]
\i<ZPSHPOS3:DINA3:ZPSBAR>\n
\i<ZPSHPOS3:DINA3:ZHPC128>\n
\i<ZPSHPOS3:DINA3:ZHPC39>\n
\i<ZPSHPOS3:DINA3:ZHPCPSN9>\n
\i<ZPSHPOS3:DINA3:ZHPCQR>

Figures 3D, 3E:
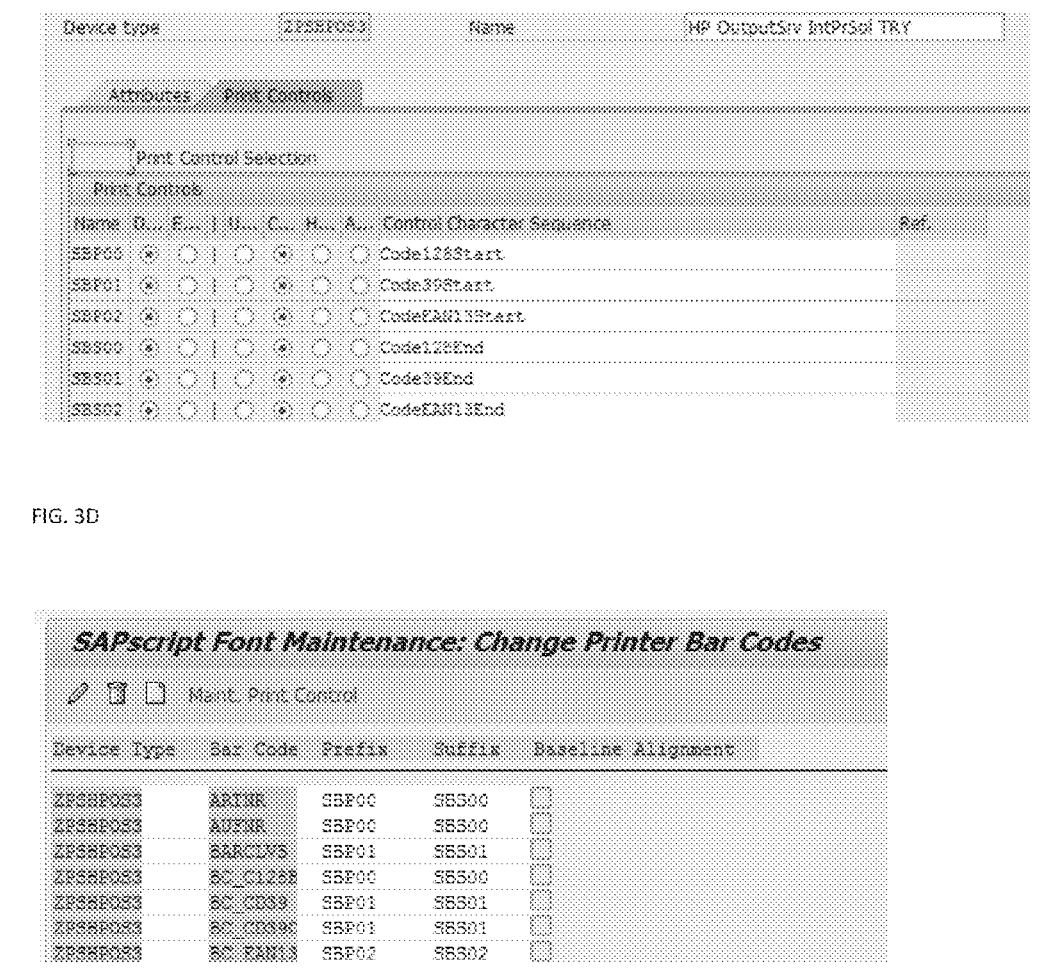

FIG. 3D illustrates selection of a print control in a SAP ERP environment. Print controls are generic format indicators for print operations and these indicators are replaced by printer commands required by a specific device type. Print controls together with the device type formats make up the language for the SAP formatting of an available printer. SBPxx & SBSxx (xx are numbers like 00, 01, 02 . . . ) are the print controls in the device type for representing the printer barcodes. SBPxx is barcode prefix (starts barcode) and SBSxx is barcode suffix (ends barcode) and this format is used by all the sapscript drivers.

In order to call any postscript procedure or any code, the initial call occurs from the print control as a plain text. "Code128Start" with "Code128End" (SBP00SBS00) are the plain texts, which link to a procedure in the initialization ACTION code. The procedure would be the "label names", in this case, which will be passed along with the barcode data from SAP. This means that initialization action code will contain the label names to be passed along with the SAP barcode data, which are required for representing and rendering the Code128 barcode in place of the data generated by SAP in a printed document (such as, a report). The same procedure could be applied for other barcodes like Code39, EAN13 etc. as the corresponding plain texts in the print controls would call the corresponding label names specified in initialization ACTION field, for representing the corresponding barcodes.

Printer barcodes supported by SAP are specified with proper print control sequence (SBPxx && SBSxx) in order to have a proper reference to the procedure. Therefore, if a sapscript has a barcode "ARTNR" (Code128), the corresponding SBPxx & SBSxx would be called and those will be replaced with corresponding label names. This is illustrated in FIG. 3E.

Postscript procedure could be defined under "Actions" which will be referenced from the printer initialization of all formats. To provide an example, let's take the Duplex mode feature and let the plain text for referring the postscript procedure under the print control as "PrintModeDuplex". In this case, the procedure under the printer initialization could be:
/PrintModeDuplex {<</Duplex true/Tumble false>>setpagedevice} def\n Similarly the procedures for barcode C128 could look like below.
/Code128Start {"Label code for barcode generation and rendering"} def\n
/Code128End {"Label code for extended barcode features"} def\n The plain text would get replaced by the label names and the same could be transmitted to a computer server, such as computer server 104 of FIG. 1, along with the barcode data.

At block 204, the label name(s) is analyzed to identify the corresponding barcode in the barcode data. In an implementation, said analysis is performed by a server module, such as server module 118 of FIG. 1, at a computer server. Server module may be a standalone server program or a component coupled to a server program or system. In an implementation, server module is a component coupled to a server program or system from Hewlett-Packard Company, for example HP Output Management (HPOM) program.

Sever module upon receipt of a data stream containing barcode data and a unique label name corresponding to a barcode in the barcode data, analyses the unique label name to identify the barcode in the barcode data. Server module maintains a repository that stores the mapping between unique label names and their corresponding bar codes. Thus, in an implementation, when a data stream containing barcode data and a unique label name is received, for instance, from an ERP system, server module scrutinizes the unique label name in the data stream and identifies the barcode corresponding to the unique label name by referring to said repository.

At block 206, server module replaces a barcode identified in barcode data with a Postscript program unique to the identified barcode. The Postscript program may be stored in the repository that stores unique label names along with their corresponding barcodes. Thus, the repository may also store a Postscript program corresponding to each barcode. Upon identification of a barcode corresponding to a unique label name in a data stream, the identified barcode is replaced with a corresponding Postscript program in the data stream. Server module substitutes the necessary postscript code for barcodes in place of the label names in a document data stream. Server module may also format the entire document in the data stream and place the barcode at its designated location in the document. A Postscript program is meant to define and represent a barcode structure, and to perform a visual rendition or representation of a barcode. A Postscript program may also address other barcode operations such as vertical shift, horizontal shift, expand, shrink, movement of a barcode in all four directions, barcode positioning, scaling, sizing, rotation etc.

At block 208, data stream containing a Postscript program unique to a barcode identified earlier (along with document data, if present) is transmitted to a printer for printing the identified barcode. The printer, upon receipt of said data stream, prints the barcode (along with document data, if present) on a print medium, such as paper. The printer may be a dot-matrix printer, an inkjet printer, a laser printer, a PostScript (PS) printer, etc.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in the illustrated figures are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

I claim:

1. A method of printing barcodes from an Enterprise Resource Planning (ERP) system, comprising:
    receiving a label name and a barcode data at a server, wherein the label name is unique to a barcode in the barcode data;
    accessing, by a processor, a mapping between the label name and the barcode to identify the barcode in the barcode data;
    replacing the identified barcode in the barcode data with machine readable instructions, wherein the machine readable instructions are unique to the identified barcode and are to visually render the identified barcode; and
    transmitting the barcode data containing the machine readable instructions for printing the identified barcode.

2. The method of claim 1, further comprising printing the identified barcode using a printer.

3. The method of claim 1, further comprising:
  storing the mapping between the label name and the barcode in a repository; and
  wherein accessing the mapping further comprises accessing the mapping from the repository.

4. The method of claim 1, further comprising storing the machine readable instructions, unique to the identified barcode, at the server.

5. The method of claim 1, further comprising maintaining the mapping between the barcode and the label name unique to the barcode at the server.

6. The method of claim 1, further comprising allocating the label name unique to the barcode at the server.

7. The method of claim 1, wherein the barcode data is part of a print request data stream from the ERP system to a printer.

8. The method of claim 1, wherein the label name is added to the barcode data by a device type file.

9. A computer server, comprising:
  a processor; and
  a memory on which is stored machine executable instructions that are to cause the processor to:
    access, upon receipt of a data stream, wherein the data stream includes a barcode data and a label name unique to a barcode in the barcode data, a mapping between the label name and the barcode to identify the barcode;
    replace the identified barcode in the barcode data with machine readable instructions, wherein the machine readable instructions is unique to the identified barcode and is to visually render the identified barcode; and
    transmit the barcode data containing the machine readable instructions for printing the identified barcode.

10. The computer server of claim 9, wherein the data stream includes a document data.

11. The computer server of claim 10, wherein the machine executable instructions are further to cause the processor to format the document data prior to transmitting barcode data containing the machine readable instructions for printing the identified barcode.

12. The computer server of claim 9, wherein the machine executable instructions are further to cause the processor to define the label name unique to the barcode.

13. The computer server of claim 9, wherein the machine executable instructions are further to cause the processor to maintain a mapping between the barcode and the label name unique to the barcode.

14. A non-transitory processor readable medium, the non-transitory processor readable medium comprising machine executable instructions, the machine executable instructions when executed by a processor causes the processor to:
  receive a label name and a barcode data, wherein the label name is added to the barcode data and wherein the label name is unique to a barcode in the barcode data;
  access a mapping between the label name and the barcode to identify the barcode in the barcode data;
  replace the identified barcode in the barcode data with machine readable instructions, wherein the machine readable instructions are unique to the identified barcode and are to visually render the identified barcode; and
  transmit the barcode data containing the machine readable instructions for printing the identified barcode.

* * * * *